UNITED STATES PATENT OFFICE.

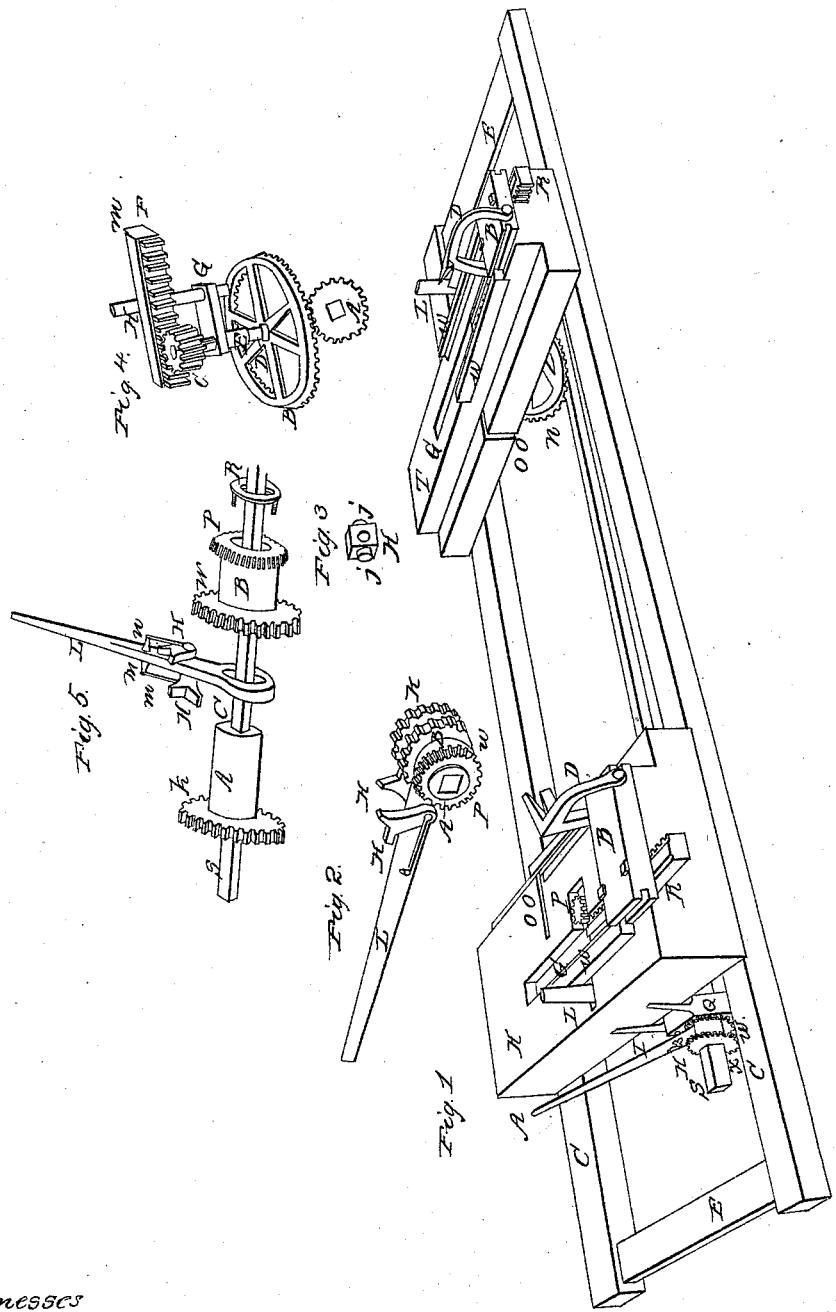

WATERMAN B. PALMER, OF BROOKFIELD, NEW YORK.

SETTING SAW-LOGS.

Specification of Letters Patent No. 3,678, dated July 24, 1844.

*To all whom it may concern:*

Be it known that I, WATERMAN B. PALMER, of the town of Brookfield, in the county of Madison and State of New York, have invented a new and useful improvement for the use of sawmills in the manner of moving, adjusting, and controlling the log, timber, or other material to be sawed, preparatory to and during the process of sawing; and I do hereby declare that the following is a full and exact description of the construction and operation of the same, reference being had to the annexed drawings, in which—

Figures 2, 3, 4, and 5 are perspective views of different parts of my said invention and Fig. 1 of the entire machine.

I construct my log carriage, movable dogs and ways in any of the known forms or in any of the forms hereinafter fully described and explained, and I apply to them the following described machinery to wit:—

C, C, (Fig. 1,) represents the sides of a common log carriage and E, E, the end pieces; H, the head block, and T, the tail block. The head and tail blocks are blocks which lie across the log carriage for the purpose of holding the log. The head block supports that end of the log at which the saw is placed before it starts into the log, and the tail block the opposite end. The head block slides upon the side pieces of the log carriage, to accommodate logs of different length while the tail block is made stationary, near one end of the same.

O, O, Fig. 1, are the slits into which the saw passes. It passes into the slit on the head block that it may clear the end of the log, and into the tail block slit so as not to leave a stub short.

Thus far I have described only what is common to all saw mills. I now proceed to describe the construction and arrangement of the machinery which I use and which with the several variations of it hereinafter fully described and explained constitutes my invention and improvement.

S, (Fig. 1,) is a long shaft extending from its termination at the outside of the tail block, nearly or entirely the whole length of the log carriage, or to any required distance in that direction. This shaft is attached to the under side of the tail block T, (Fig. 1,) with a common box and hanger. The use of this shaft is to move the dog upon the tail block, while standing at the lever A, (Fig. 1) and consequently the log or material to be sawed, to which such dog is attached. Fig. 4, is intended to represent the racks and spur pinions, rolling boxes, upright shafts, bevel wheels and bevel pinions in both the head and tail blocks, these several parts, together with their relative situation and arrangement, being precisely the same in both the head and tail block. Upon the tail block end of the log shaft S, Fig. 1, is a small bevel pinion represented by A, (Fig. 4) which acts by means of its cogs upon the large bevel wheel N, (Fig. 1) lying under the tail block, T (Fig. 1). Immediately under the head block H, (Fig. 1) is another large bevel wheel represented at B, (Fig. 4) which is acted upon by the cogs of the small bevel pinion P, (Fig. 2). These two large bevel wheels hang suspended one under the head block H, (Fig. 1) and the other under the tail block T, (Fig. 1) and each upon the lower end or extremity of an upright shaft E, (Fig. 4) which shafts extend up, one through the head block and the other through the tail block, in a line, at right angles with the line of the long shaft S, (Fig. 1). The upper end of each of the upright shafts here described is accommodated with a small spur pinion C, (Fig. 4). That on the upright shaft in the head block is also shown by letter (P, Fig. 1). Each of these upright shafts is adjusted in a rolling box, Fig. 3, at its lower end, and a sliding box, G, (Fig. 4) at its upper end in such a manner as to allow them to turn a given distance on the journals of the rolling boxes.

D, Fig. 4, is the bearing on the upright shaft E, (Fig. 4) for the rolling boxes.

*j, j*, are the journals of the rolling boxes (Fig. 3) and H (Fig. 3), the hole through which the upright shaft E (Fig. 4) passes.

The sliding boxes are each a flat and long plate, with a hole in one of the ends, sufficient to allow the upper end of the upright shafts to pass through it. These sliding boxes lie in a horizontal position and are each accommodated with an upright lever L, L, (Fig. 1) and H (Fig. 4) for the purpose of moving the sliding boxes forward and backward, in the direction admitted by the journals of the rolling boxes. The sliding boxes are placed on the upright shafts either immediately above or below the spur pinions and are mortised, one into the head block H, (Fig. 1) and the other into the tail block T (Fig. 1). The upright levers L, L, (Fig. 1) and H (Fig. 4) pass down one into the head block through one of the sliding boxes and the other lever down into the tail block, through the other sliding box. The fulcrum of each of these levers is formed by the action of its lower end against the sides of the mortise under the sliding box. R, R, (Fig. 1,) are two racks fitted with perpendicular cogs, which are acted upon, one by the cogs of the spur pinion P, (Fig. 1) in the head block, and the other rack by the cogs of the corresponding spur pinion in the tail block. These racks and pinions are alike in the head and tail blocks, and are represented by R and C, (Fig. 4). The racks R, R, Fig. 1, are placed in the grooves G, G, (Fig. 1) which are cut, one out of the top of the head block and the other out of the top of the tail block. The spaces between the racks and grooves are covered over with plates, fastened one to the head and the other to the tail block, in such a manner that the edges of these plates lie against the shoulders M, (Fig. 4) in the rabbets F (Fig. 4) of the racks.

W, W, W, W, (Fig. 1) are the ways, on which are placed the sliding blocks B, B, (Fig. 1.) The sliding blocks B, B, are grooved at each end, to allow them to pass on to the tongues of the ways, and are made fast to the racks R, R, (Fig. 1) by strong bolts or rivets.

D, D, (Fig. 1) are the old-fashioned bail dogs, which are attached to the sliding blocks B, B, (Fig. 1) by means of bolts upon which they turn.

I (Fig. 1) is a hanger which incidentally holds the long shaft S, (Fig. 1) in its proper situation under the head block H (Fig. 1).

Q (Fig. 1) is a box, to hold which is the main purpose of the hanger I.

Fig. 2 represents the lever A, (Fig. 1) and its appendages detached from the rest of the machine, and Fig. 5 the lever A, (Fig. 1,) and its appendages, detached from each other.

H, H, (Figs. 1, 2 and 5) are two small hands placed on studs or pins (n, Fig. 5) standing out from the sides of the lever A, (Fig. 1) and L, (Figs. 2 and 5) through which hand power is communicated from the lever A, to the index or ratchet wheels K, W, (Figs. 1, 2, and 5) or to either of them as occasion may require. These hands are each fitted with a small spring S (Fig. 2) and m, m, (Fig. 5) on opposite sides of the lever A, (Fig. 1) and L, (Figs. 2 and 5). Although these springs incidentally keep the hands H, H, from slipping off from the studs or pins, yet the main design of them is to disallow the hands H, H, from acting upon the index or ratchet wheels K, W. The index or ratchet wheel K, (Figs. 1, 2 and 5,) is attached to the end of a cylindrical tube A, (Fig. 5,) the outside surface of which is accurately fitted to the inside surface of another cylindrical tube B, (Fig. 5,) into which it passes and within which it revolves when required. The ratchet wheel W, (Figs. 1, 2 and 5,) is attached to one end of the external cylindrical tube B, (Fig. 5) and the bevel pinion P, (Figs. 2 and 5) is attached to the other end of it and revolves with it. The lever A, (Fig. 1) and L, (Figs. 2 and 5) forms its axis or fulcrum around the internal cylindrical tube A, (Fig. 5) and lies immediately between the index or ratchet wheels K, W, (Figs. 1, 2 and 5). The internal cylindrical tube A, (Fig. 5), to one end of which the ratchet wheel K, (Figs. 1, 2 and 5) is attached, is maintained in its proper position within the external cylindrical tube B, (Fig. 5) by means of a small collar or ring R, (Fig. 5) which is made fast to the inside end of the internal cylindrical tube itself.

A, (Fig. 2) is a square hole through the center of the internal cylindrical tube of sufficient size to admit the long shaft S, (Figs. 1 and 5,) accurately to pass through it. The internal cylindrical tube A, (Fig. 5) slides upon the long shaft S, (Figs. 1 and 5) whenever the head block H, (Fig. 1) is moved.

B (Fig. 2) is the smooth and even surface of the outside of the external cylindrical tube B, (Fig. 5,) between the bevel pinion P, (Figs. 2 and 5) and the index or ratchet wheel W, (Figs. 1, 2, and 5). This portion of the external cylindrical tube forms a bearing which revolves in the box Q (Fig. 1). When the parts of the machine, represented by Figs. 2 aid 5, are in their relative and proper positions in the machine, the long shaft S, (Fig. 1,) passes through the hole A, (Fig. 2) in the internal cylindrical tube and the cogs of the bevel pinion P, (Figs. 2 and 5,) are in contact with those of the large bevel wheel represented at B, (Fig. 4) and lying immediately under the head block H, (Fig. 1).

The object of the combination of the lever L (Fig. 2) with the hands H, H, (Figs. 1, 2 and 5) ratchet wheels K, W, (Figs. 1, 2 and 5,) springs and cylindrical tubes above mentioned is to give perfect control over the log to be sawed preparatory to, and during the process of sawing and to enable one without leaving his position at the lever A (Fig. 1) to move either of the dogs D, D (Fig. 1) alternately, or both together, in any direction allowed by the racks and spur pinions in the head and tail blocks, and consequently, to move the entire log, into which the dogs D, D, fasten, or to move either end of it in a like direction at pleasure.

By connecting one of the hands H (Figs. 1 and 2) with the ratchet wheel K, (Figs. 1 and 2) the other hand being suspended in the spring the action of the lever A, (Fig. 1) moves only the tail end of the log, and by connecting one of the hands H with the ratchet wheel W, (Figs. 1 and 2), the other hand being suspended in the spring, the action of the lever A, (Fig. 1) moves only the head of the log, and by connecting both of the hands with the ratchet wheels, on the same side of the lever, the lever moves both ends of the log in the same direction.

The object of the arrangement of the upright shafts hereinbefore described, by which they can be moved in a certain manner, is, that the spur pinions on the upper ends of these shafts, as shown in Fig. 4, may be thrown out of gear from the racks, (into which they act by means of cogs as hereinbefore described) as often as convenience may require.

I now proceed to describe and fully explain the various modes in which I have contemplated the application of the lever L (Fig. 2) hands H, H, index or ratchet wheels K, W, springs and cylindrical tubes hereinbefore mentioned, arranged and combined as hereinbefore described, and which combination and arrangement and the application thereof to the purposes aforesaid constitutes mainly my invention and improvement.

The first variation consists in merely lengthening out the racks R, R, (Fig. 1) and by this means throwing the long shaft S, (Fig. 1,) on to the other side of the saw with its accompanying gearing and shafts, and in short all the gearings and shafts must of necessity in this case be removed to the other side of the saw. With this arrangement, instead of using the perpendicular levers L L, (Fig. 1) I extend the upright shafts themselves up through the head and tail blocks H and T, (Fig. 1,) far enough for their upper ends to form handles or levers.

The second variation consists in converting the machine hereinabove described with the first variation into left handed machines. A left handed machine is one where the log lies on the other side of the saw and moves toward it in a direction opposite to that in which it moves in the machine hereinbefore described and in the aforesaid variation thereof. To convert the machine and its variation aforesaid into a left handed machine I put the machinery on to the other ends of the head and tail block, H, and T, (Fig. 1) and fasten the sliding blocks B, B, (Fig. 1,) to the other ends of the racks R, R, (Fig. 1) and change the dog, D, (Fig. 1) which is on the head block H, (Fig. 1,) on to the tail block T, (Fig. 1,) and vice versa.

Another variation which I have contemplated is as follows to wit: Instead of using elevated ways as shown by W, W, W, W, (Fig. 1) I use flat plates fastened to the tops of the head and tail blocks H and T (Fig. 1). On the inside ends of the sliding blocks B, B, (Fig. 1) I invert the grooves by making them open toward the centers of the blocks, that they may run on the edges of the flat plates which lie toward the center of the log carriage. To form grooves in the other ends of the blocks B, B, (Fig. 1) I elevate the racks R, R, in their centers through their entire length on their upper sides and this forms what is called a rabbet. I then fasten the outside ends of the sliding blocks B, B, (Fig. 1,) on to the elevation of the racks, and in this manner grooves are formed to receive the edges of the flat ways. The other arrangements of the machinery on the head block H, (Fig. 1,) I make after either or any of the modes herein above described, according to the form I wish to give the machine. But on the tail block T, (Fig. 1) I make the following changes to wit: I change ends and sides of the rack R, (Fig. 1) which brings its cogs standing or projecting toward the outside of the machine, and this of course changes the positions of both the spur pinion which gears into the rack, and the bevel pinion which gears into the large bevel wheel N, (Fig. 1) lying immediately under the tail block T, (Fig. 1,) the spur pinion being thrown on to the outside of the rack R, and the bevel pinion which is attached to the end of the long shaft S, (Fig. 1) on to the inside edge of the large bevel wheel n, (Fig. 1).

Another variation which I have contemplated is as follows to wit:—Instead of using racks and pinions to move the dogs D, D, (Figs. 1) I use screws placed on the tops of the head and tail blocks H, and T, (Fig. 1). The sliding blocks, corresponding with B, B, (Fig. 1,) to which the dogs are attached I place on any of the known forms of ways or on any of the forms herein above described. These sliding blocks are attached to opening nuts, which nuts have threads exactly corresponding with the threads of the screws. The screws are made stationary by boxes at each end, and the nuts run upon them, carrying along the sliding blocks B, B, (Fig. 1). Upon the screws I make any number of threads to the inch, but have found that a double threaded screw constructed so that it will move along the sliding block with each entire revolution exactly two inches is perhaps the most convenient form. The screw upon the head block I make with a hole through its center lengthwise, and something longer than the one on the tail block. These screws of course I place transversely with the sliding blocks B, B, and lengthwise of the head and tail blocks. Through the hole in the center of the head block screws I pass a shaft. The bearings of this shaft are fitted to each end of the screw, or in other words the boxes of the shaft are formed by the hole in the screw. This shaft is longer than the screw through which it passes and stands out at each of its ends. At the right hand end just far enough to put on a large bevel wheel, and at the other end far enough to put on a lever and index or ratchet wheel. The lever lying up close to the end of the screw, and the index or ratchet wheel close to the lever. Upon the end of the screw against which the lever lies, is made fast another index or ratchet wheel precisely in all respects like the one which is made fast to the shaft outside of the lever.

The arrangement and combination of the lever which I am now describing is precisely like the one herein above described and represented by Fig. 2 and produces precisely the same effects. It lies immediately between the index or ratchet wheels, forms its axis or fulcrum around the shaft which passes through the hollow screw and has a small hand upon each of its sides arranged with springs to act upon the index or ratchet wheels. On the tail block I place a screw, corresponding in its threads with the hollow screw on the head block. This screw is attached to the sliding block B, with an opening nut, is not hollow but has fastened to its right hand end a large bevel wheel precisely agreeing with the large bevel wheel above described as being attached to the end of the shaft which passes through the hollow screw. I now place a long shaft along the whole length of the log carriage and across the tops of the right hand ends of the head and tail blocks. On the head block I fasten by means of a box a small revolving bevel pinion with a hole through its center which admits the long shaft to pass through it in such a manner that the revolutions of the small bevel pinion causes the long shaft to revolve also. This small bevel pinion slides on the long shaft and is acted upon by the cogs of the large bevel wheel which is fastened to the end of the shaft passing through the hollow screw. On the end of this long shaft, which is attached to the tail block, by means of a box, in which it turns, I fasten another small bevel pinion of equal size with the revolving pinion upon the head block, which acts, through its cogs, on the large bevel wheel attached to the end of the tail block screw. To convert this screw form of the machine into a left handed machine, I make screws with left handed threads and put them with the rest of the machinery on to the opposite ends of the head and tail blocks.

For the proportion of all the bevel wheels hereinabove described I use from miters up to eight revolutions of the pinions, to one of the large wheels, embracing all the intermediate proportions. I construct the index or ratchet wheels so that every tooth shall represent, either one eighth, one fourth or one half, of an inch in thickness of the stuff to be sawed, but I prefer that number of teeth which shall represent one eighth.

To operate my machine I stand by the lever L (Fig. 2) and move it in the direction required, which causes the small hands H, H, (Fig. 2) to act upon the index or ratchet wheels K, W, (Fig. 2). When I desire to saw lumber of even thickness, I let both of the hands H, H, act upon the index or ratchet wheels K, W, and this moves both ends of the log exactly alike; but when I wish to saw lumber tapering I let both of the hands act until the log is brought up to the thickness of the thinnest end and then I catch up one of the hands under the spring on the side of the lever L, Fig. 2 and move along the end required, or I operate the lever L, and the hands in any other manner which will accomplish this result. If I wish to throw one end of the log one way and the other end the other way, I do it by letting one hand fall upon the index or ratchet wheel on one side of the lever and bringing the other hand down upon the ratchet wheel on the opposite side of the lever. And by means of this machine I am enabled to do whatever is desirable with the log without loosening it from the dogs.

What I claim as my invention and desire to secure by Letters Patent is—

The combination, arrangement and application of the lever L (Fig. 2), movable hands H, H, (Fig. 2) ratchet wheels K, W, Fig. 2, springs and cylindrical tubes Figs. 2 and 5 as hereinbefore described for the purpose of moving, adjusting and controlling the log, timber or other material to be sawed, preparatory to and during the process of sawing together with the combinations and arrangements of the aforesaid lever L, (Fig. 2) hands, ratchet wheels, springs and cylindrical tubes, with the long shaft S, (Fig. 1). bevel pinions, bevel wheels, spur pinions and racks, in the manner hereinbefore particularly set forth, specified, and described.

WATERMAN B. PALMER.

Witnesses:
G. W. HOTCHKISS,
SAMUEL SANDERS.